Oct. 5, 1954  A. D. GOODWIN  2,690,639
HYDRAULIC SYSTEM FOR TREE SHAKERS
Filed Feb. 9, 1952  2 Sheets-Sheet 1

INVENTOR
Alfred D. Goodwin
BY
ATTYS

Oct. 5, 1954  A. D. GOODWIN  2,690,639
HYDRAULIC SYSTEM FOR TREE SHAKERS
Filed Feb. 9, 1952  2 Sheets-Sheet 2
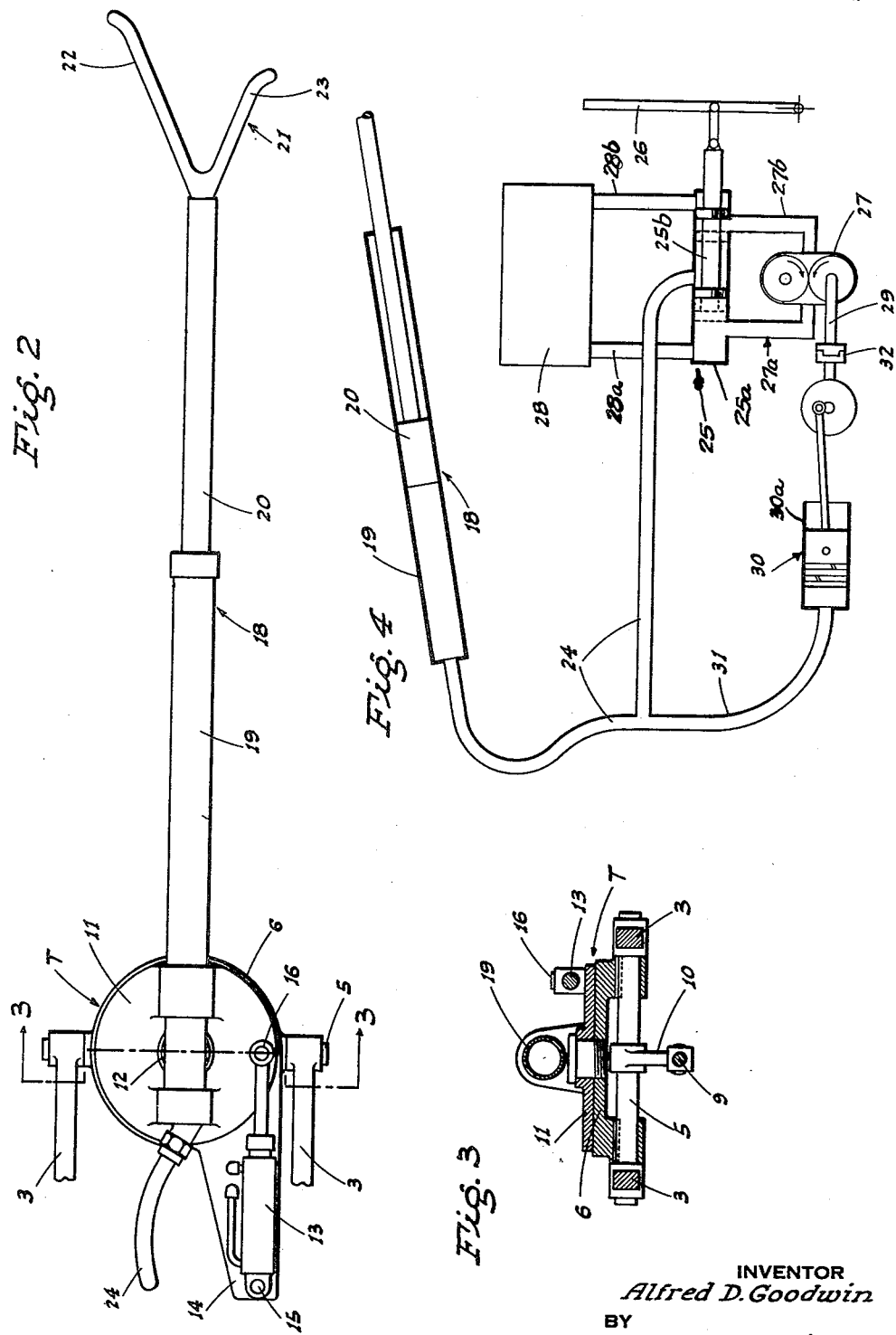
INVENTOR
*Alfred D. Goodwin*
BY
*ATTYS*

Patented Oct. 5, 1954

2,690,639

UNITED STATES PATENT OFFICE 2,690,639

HYDRAULIC SYSTEM FOR TREE SHAKERS

Alfred D. Goodwin, Manteca, Calif., assignor to A. D. Goodwin & Son, Manteca, Calif., a partnership Application February 9, 1952, Serial No. 270,853

2 Claims. (Cl. 56—328)

This invention relates to a tree shaking apparatus, and particularly to one which is tractor-mounted.

One of the objects of the invention is to provide an apparatus for the purpose which includes a rigid shaking boom having a tree engaging element at its outer end, and means mounting the boom so that the horizontal or vertical position of the outer end of the boom, and independently the distance of said outer end from the tractor, may be adjusted within certain limits without moving the tractor from a fixed position relative to the tree. Maneuvering of the tractor to enable a number of different limbs of the tree to be engaged and shaken is therefore unnecessary.

Another object of the invention is to provide an extensible or telescopic boom, in the form of an elongated cylinder and piston, the piston being extended by passing hydraulic fluid into the cylinder, with means then acting on the fluid to impart a surge thereto which imparts a shaking movement to the piston on which the tree shaking element is mounted.

It is also an object of the invention to provide a hydraulic tree shaker which is designed for ease and economy of manufacture; convenience of operation; and long service with a minimum of servicing or maintenance required.

Still another object of the invention is to provide a practical and reliable hydraulic tree shaker, and one which will be exceedingly effective for the purpose for which it is designed.

These objects are accomplished by means of such structure and relative arrangement of parts as will fully appear by a perusal of the following specification and claims.

In the drawings:

Fig. 2 is an enlarged top plan view of the boom.

Fig. 3 is a transverse view mainly in section, substantially on line 3—3 of Fig. 2.

Fig. 4 is a diagram of the hydraulic control system for the boom.

Figure 1:
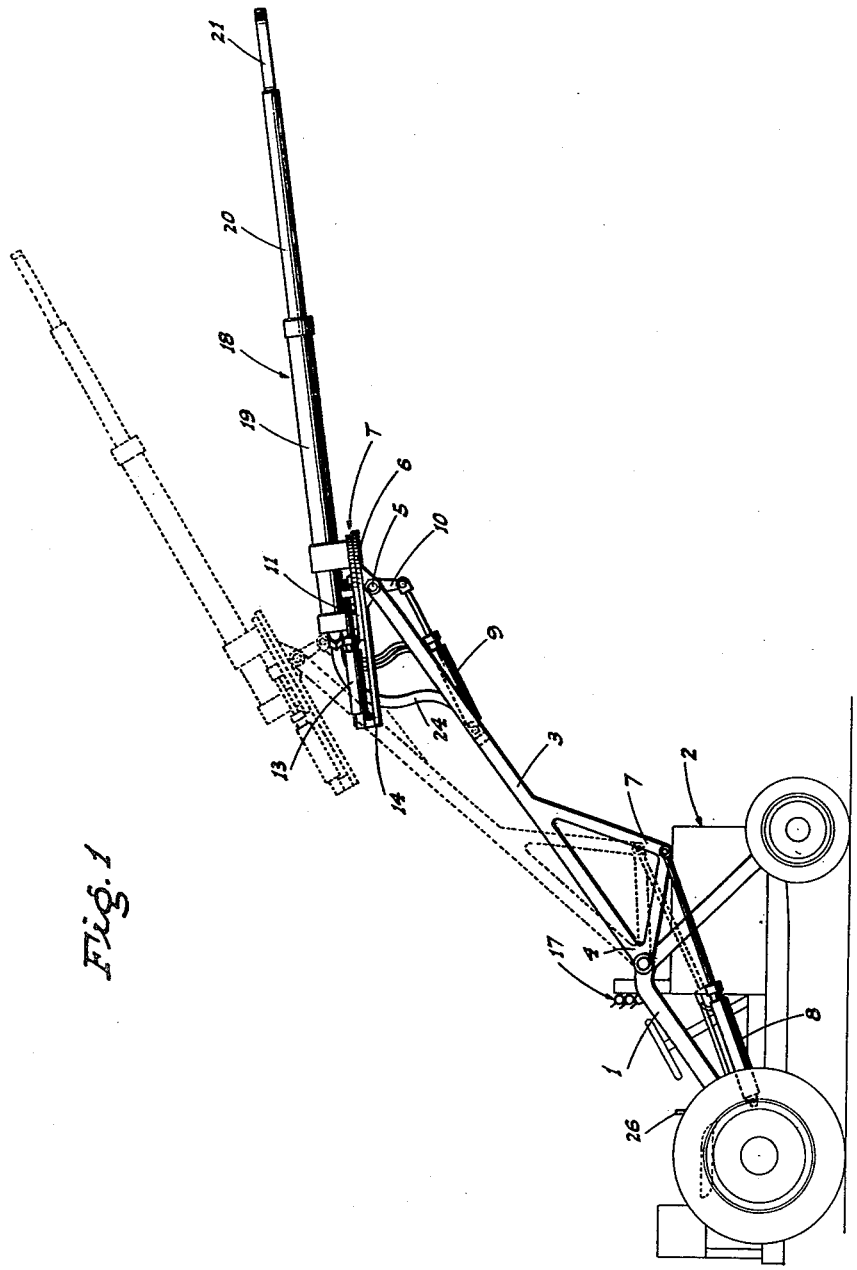
Fig. 1 is a side elevation of the tree shaker as mounted on a tractor.

Referring now more particularly to the characters of reference on the drawings, the shaker apparatus comprises supporting frames 1 preferably of A or inverted V form, disposed one on each side of a tractor 2 and rigidly mounted thereon by any suitable means.

Extending at an upward angle away from the tractor are side arms 3, pivoted at their lower end on frames 1 adjacent their apex as at 4, and at their upper end turnably supporting a transverse shaft 5 fixed rigid with the lower platform 6 of a turntable T.

Each arm 3 at its lower end has a depending portion 7, a hydraulic ram 8 extending between portion 7 and the tractor or frame 1 in such a manner that the angle of arms 3 and consequently the height of their upper end can be readily altered by suitable actuations of the rams.

Another hydraulic ram 9 extends between arms 3 and a short arm 10 depending from shaft 5 so that the angularity of turntable T relative to arms 3—and to the ground—may be altered at will.

Superimposed on platform 6 is another platform 11 turnably mounted on platform 6 by means of a central pin 12. Rotation of platform 11, which is preferably circular, is controlled by a hydraulic ram 13 extending between and connected at one end to an extension 14 of platform 6 clear of platform 11, as at 15, and said platform 11 adjacent its periphery as at 16. Hydraulic pressure for actuating rams 8, 9, and 13 is, of course, generated on the tractor by conventional apparatus with which most tractors are now equipped and piping systems which it is not deemed necessary to illustrate; the control valves 17 for the systems of the three rams being mounted on the tractor in a position convenient to the operator thereof as shown in Fig. 1.

Secured on platform 11 and projecting therefrom away from the tractor is a boom indicated generally at 18. This boom is actually a hydraulic ram and comprises an elongated cylinder 19, secured on the platform 11, having an elongated piston or plunger 20 slidable therein and projecting therefrom; said piston at its outer end mounting a tree engaging fork 21, having relatively long and short legs 22 and 23 respectively.

The plunger is free to turn in the cylinder so that the fork may shift out of a horizontal position; this being an advantage since some limbs to be engaged may be angularly disposed relative to the machine in more than one direction. In such cases, the boom is manipulated so that the limb engages the long leg 22 of the fork from the inside beyond the shorter leg 23. A short lateral swing imparted to the boom will then cause the fork 21, no matter what its initial position, to assume a transverse position at right angles to the limb. Thereafter, a longitudinal movement of the boom will completely engage the fork with the limb for the subsequent shaking movement, as later described.

The boom is mounted on the platform so that when disposed centrally between its limits of adjustment, the boom extends lengthwise of the tractor and arms 3, and is at right angles to the cross shaft 5.

In order to lengthen the boom when desired, and to impart a jerky shaking movement to the plunger, the following hydraulic system is provided:

Connected to the rear end of the cylinder is a conduit 24 which extends to a three-position control valve 25, preferably of conventional piston type, actuated by a hand lever 26 disposed convenient to the operator of the tractor as indicated in Fig. 1. The valve 25 is interposed in a fluid circulating system which includes a constant pressure pump 27 and a fluid supply reservoir 28. The pump 27 is connected to an intake conduit 27a and to a pressure or discharge conduit 27b leading to a valve casing 25a. Passages 28a and 28b connect the valve casing and reservoir 28 in such relation to conduits 27a and 27b, to the conduit 24 and to the moving piston 25b of valve 25 so that upon suitable shifting of the valve piston, communication may be established from the pump through conduits 24 and conduit 27b and at the same time through passages 27a and 28a to thus supply pump pressure to the plunger 20 to elongate the boom. Alternately, communication may be established between conduits 24 and 27a to relieve pressure from ram 18, and between conduits 27b and 28b to return the fluid to reservoir 28. The valve piston may also be moved to a closed position such that the conduit 24 may be shut off from both conduits 27a and 27b, holding the pressure in the ram, while placing said conduits in communication with conduits 28a and 28b respectively so that fluid will be circulated back and forth between the pump and reservoir. The pump is preferably driven by the power takeoff shaft 29 of the tractor, which also drives a reciprocating short-stroke surge pump 30, from the back end of the cylinder 30a of which a conduit 31 leads to a connection with conduit 24 so as to provide a continuously open passage between the pump cylinder and the cylinder 19, as shown in Fig. 4. A control clutch 32 may be interposed in shaft 29 ahead of pump 30, so that said pump is not operated except when wanted.

In the operation of the tree shaker, the tractor is positioned adjacent the tree to be shaken and the fork 21 is adjusted by operation of one or more of the different boom-position control rams, to place said fork in engagement with the tree limb to be shaken.

When the boom has been extended to the desired extent by manipulation of valve 25, to supply fluid to the boom to extend the same, the valve 25 is closed; cylinder 19, conduits 24 and 31 being then completely filled with the hydraulic fluid, which, of course, is non compressible.

Operation of pump 30 then causes a short longitudinal back and forth shifting of the fluid in cylinder 19, imparting a corresponding movement to the tree-engaged plunger, and since the engaged limb of the tree is, of course, resilient and yieldably resists a pushing movement, and the pump stroke is short and rapid, a rapid shaking movement is imparted to the tree which is very effective to dislodge the nuts or fruit from the tree.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A hydraulic operating system for the shaker boom of a tree shaking apparatus and which boom comprises an elongated hydraulic ram which includes a relatively immovable cylinder and a plunger projecting from the front end thereof, a conduit system leading from a source of supply to the rear end of the cylinder, controlled means included in the system to feed hydraulic liquid through the system and into the cylinder in selectively different amounts to fill said system and cylinder behind the plunger and so vary the length of the boom, a valve in the system to confine such liquid in the cylinder and in the portion of the system between the cylinder and valve, said system portion and the cylinder behind the plunger forming a continuous enclosure for the confined liquid, a conduit in the system connected and open at one end to the enclosure so that said conduit will receive liquid as fed into the enclosure, and means connected to the conduit to impart short and rapidly recurring reciprocating movement to the liquid in the conduit.

2. A structure as in claim 1, in which the last named means includes a short-stroke reciprocating pump having a cylinder closed at one end, the conduit being connected at its outer end to the closed end of the cylinder.

References Cited in the file of this patent

UNITED STATES PATENTS

| Number | Name | Date |
| --- | --- | --- |
| 840,803 | Prellwitz | Jan. 8, 1907 |
| 1,472,262 | Abildgaard | Oct. 30, 1923 |
| 1,623,497 | Rurup | Apr. 5, 1927 |
| 1,626,068 | Bartlett | Apr. 26, 1927 |
| 2,159,311 | Berger | May 23, 1939 |
| 2,472,223 | McElhinney et al. | June 7, 1949 |
| 2,500,931 | Curtis | Mar. 21, 1950 |
| 2,581,667 | Joy | Jan. 8, 1952 |
| 2,614,808 | Curtis et al. | Oct. 21, 1952 |
| 2,638,326 | Lehner | May 12, 1953 |

OTHER REFERENCES

Diamond Walnut News, September 1949, page 5.